US011649303B2

(12) United States Patent
Nguyen et al.

(10) Patent No.: US 11,649,303 B2
(45) Date of Patent: May 16, 2023

(54) SOLVENT-FREE PROCESS FOR FUNCTIONALIZING ISOBUTYLENE-BASED POLYMERS (71) Applicant: ExxonMobil Chemical Patents Inc., Baytown, TX (US)

(72) Inventors: Paul Tu Quang Nguyen, League City, TX (US); David J. Freas, LaPorte, TX (US); Tu N. Pham, Houston, TX (US); Yuan-Ju Chen, Houston, TX (US); Edward J. Blok, Huffman, TX (US); Anthony J. Dias, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 148 days.

(21) Appl. No.: 17/040,322

(22) PCT Filed: Mar. 29, 2019

(86) PCT No.: PCT/US2019/024914
§ 371 (c)(1),
(2) Date: Sep. 22, 2020

(87) PCT Pub. No.: WO2019/195111
PCT Pub. Date: Oct. 10, 2019

(65) Prior Publication Data
US 2021/0017304 A1    Jan. 21, 2021

Related U.S. Application Data (60) Provisional application No. 62/651,964, filed on Apr. 3, 2018.

(30) Foreign Application Priority Data

May 16, 2018   (EP) .................... 18172743

(51) Int. Cl.
C08F 8/34    (2006.01)
C08F 8/32    (2006.01)

(52) U.S. Cl.
CPC .................. C08F 8/34 (2013.01); C08F 8/32 (2013.01); C08F 2810/50 (2013.01)

(58) Field of Classification Search
CPC ........ C08F 8/34; C08F 210/10; C08F 212/16; C08F 212/18; C08F 212/21; C08F 212/08; C08F 212/12
See application file for complete search history.

(56) References Cited

U.S. PATENT DOCUMENTS 3,645,935 A    2/1972  Scott
4,146,689 A *  3/1979  Onizawa .................. C08K 5/16
                                                   525/352

(Continued)

FOREIGN PATENT DOCUMENTS

CA        2009681         4/1991
WO    WO 2007/016770     2/2007
WO    WO 2009/064295     5/2009

OTHER PUBLICATIONS

Parent, S. et al., Auto-Catalytic Chemistry for the Solvent-free Synthesis of Isobutylene-rich Ionomers, Green Chem. 2011, 13, 2818, pp. 2818-2824.

*Primary Examiner* — Robert C Boyle (57)    ABSTRACT

Methods of post-polymerization modification of a polymer are provided herein. The present methods comprise the step of reacting a polymer with at least one nucleophile in a nucleophilic substitution reaction performed without a solvent to produce a functionalized polymer. The nucleophile can be selected from the group consisting of thioacetate, phenoxide, alkoxide, carboxylate, thiolate, thiocarboxylate, dithiocarboxylate, thiourea, thiocarbamate, dithiocarbamate, xanthate, thiocyanate. Nucleophilic substitution reaction can (Continued)

be performed in the presence of a phase transfer catalyst. Nucleophilic substitution reaction can also be performed via a two-step in-situ reactive mixing process with the initial formation of the polymer-amine ionomer (polymer-$NR_3^+Br$) which catalyzes the subsequent nucleophilic substitution with a second nucleophile to form a bi-functional polymer.

13 Claims, 6 Drawing Sheets

(56) References Cited

U.S. PATENT DOCUMENTS

| | | | | |
|---|---|---|---|---|
| 5,162,445 | A | * 11/1992 | Powers | C08F 210/14 |
| | | | | 525/340 |
| 6,310,158 | B1 | * 10/2001 | Ishikawa | C08K 5/47 |
| | | | | 526/256 |
| 2004/0063823 | A1 | 4/2004 | Wang et al. | |
| 2009/0203850 | A1 | * 8/2009 | Parent | C08F 8/00 |
| | | | | 525/333.5 |
| 2015/0315300 | A1 | * 11/2015 | Tanabe | C08K 5/54 |
| | | | | 523/156 |

* cited by examiner

SOLVENT-FREE PROCESS FOR FUNCTIONALIZING ISOBUTYLENE-BASED POLYMERS

CROSS-REFERENCE TO RELATED APPLICATIONS

This invention is a 371 National Phase entry of International Application No. PCT/US2019/024914 filed Mar. 29, 2019, which claims priority to and the benefit of U.S. Ser. No. 62/651,964, filed Apr. 3, 2018 and EP Application No. 18172743.9, filed May 16, 2018, which are incorporated herein by reference in their entirety.

FIELD OF THE INVENTION

The present disclosure generally relates to the preparation of functionalized olefins, and more particularly relates to solvent-free process for functionalizing isobutylene-based polymer.

BACKGROUND OF THE INVENTION

Grafting polyolefins with a functional group can deliver certain desired physical properties such as impact resistance and thermostability to a polymer resin. As a post-polymerization reaction, grafting methodologies can chemically modify the macromolecular backbone of the polyolefin in order to introduce active sites capable of functionality. The number of side-groups or side-chains grafted to the macromolecule is controlled by the number of active sites.

Introduction of controlled amounts of specific functionality in the form one or more moieties or pendant groups on the backbone of a polyolefin can increase the utility of the polyolefin. For example, the functionality of a certain type and amount can allow the functionalized olefin to be used as a coating or paint for other materials and/or laminated with or dispersed in other materials to yield composite materials with a desired combination of properties.

Functionalized olefins can be synthesized through an atom-transfer radical-polymerization reaction together with anionic and cationic grafting techniques. Also, in solution, functionalized polymers can be produced by nucleophilic substitution processing. See e.g., Canadian Patent No. 2009681 A1 (where the reaction was performed in the presence of a solvent). Further, under solvent-free conditions and through an irreversible ionomer synthesis, ionomer derivatives of brominated poly(isobutylene-co-isoprene) rubber ("BIIR") have been prepared via alkylation of $PPh_3$, imidazole and 2[2-(dimethylamino)ethoxy]ethanol. Parent, S. et al., Auto-Catalytic Chemistry for the Solvent-free Synthesis of Isobutylene-rich Ionomers, Green Chem. 2011, 13, 2818.

A need exists, therefore, for solvent-free post-polymerization processes to synthesize functionalized isobutylene-based polymers in quantitative yields.

SUMMARY OF THE INVENTION

Methods of post-polymerization modification of a polymer are provided herein. The present methods comprise the step of reacting a polymer with at least one nucleophile in a nucleophilic substitution reaction performed without a solvent (also referred to herein as "substantially free of solvent") to produce a functionalized polymer. The term "substantially free of solvent" used herein refers to less than 0.1 wt % solvent, based on the total weight of the polymer and at least one nucleophile.

The nucleophile can be selected from the group consisting of thioacetate, phenoxide, alkoxide, carboxylate, thiolate, thiocarboxylate, dithiocarboxylate, thiourea, thiocarbamate, dithiocarbamate, xanthate, thiocyanate. Nucleophilic substitution reaction can be performed in the presence of a phase transfer catalyst. In an aspect, the phase transfer catalyst is a compound of a formula R4N+Br−. Nucleophilic substitution reaction can also be performed via a two-step in-situ process with the initial formation of the polymer-amine ionomer (polymer-NR3+Br−) which then catalyzes the subsequent nucleophilic substitution with a second nucleophile to form a difunctional polymer. The methods can also comprise the step of cooling the functionalized polymer to about 23° C. to about 25° C.

In an aspect, the phase transfer catalyst can be selected from the group of ammonium salts, heterocyclic ammonium salts, phosphonium salts, DL-α-Tocopherol methoxypolyethylene glycol succinate, DL-α-Tocopherol methoxypolyethylene glycol succinate solution. In an aspect, the phase transfer catalyst is tetrabutylammonium or tetrabutylammonium bromide (TBAB). In an aspect, the functionalized polymers are the thioacetate functionalized poly(isobutylene-co-para-methylstyrene) and poly(isobutylene-co-isoprene). In an aspect, the functionalized polymer are the mercaptothiazole functionalized poly(isobutylene-co-para-methylstyrene) and poly(isobutylene-co-isoprene). In an aspect, the polymer is brominated poly(isobutylene-co-para-methylstyrene) or BISMSM and brominated poly(isobutylene-co-isoprene) or bromobutyl. In an aspect, the melt salt can be potassium thioacetate and/or sodium mercapthiazole.

In an aspect, BIMSM and halobutyl rubber are mixed with thioalkylate and mercaptothiazole to produce functionalized poly(isobutylene-co-para-methylstyrene) and functionalized poly(isobutylene-co-isoprene).

In an aspect, the polymer is halogenated isoolefin polymer and/or halobutyl rubber.

In an aspect, the temperature of the nucleophilic substitution reaction is between about 70° C. to 160° C. and between about 120° C. to 150° C.

In an aspect, the reaction time of the nucleophilic substitution is approximately 10 to 30 minutes.

DESCRIPTION OF THE PREFERRED EMBODIMENTS

Various specific embodiments, versions and examples are described herein, including exemplary embodiments and definitions that are adopted for purposes of understanding the claimed invention. While the following detailed description gives specific preferred embodiments, those skilled in the art will appreciate that these embodiments are exemplary only, and that the invention can be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

All numerical values within the detailed description and the claims herein are modified by "about" or "approximately" the indicated value, taking into account experimental error and variations.

For the purposes of this disclosure, the following definitions will apply:

The term "alkyl" refers to a paraffinic hydrocarbon group which may be derived from an alkane by dropping one or more hydrogens from the formula, such as, for example, a methyl group ($CH_3$), or an ethyl group ($CH_3CH_2$).

As used herein, the term "alpha-olefin" refers to an olefin having a terminal carbon-to-carbon double bond in the structure thereof (($R^1R^2$)—C=$CH_2$, where $R^1$ and $R^2$ can be independently hydrogen or any hydrocarbyl group. In an aspect, $R^1$ is hydrogen, and $R^2$ is an alkyl group. A "linear alpha-olefin" is an alpha-olefin defined in this paragraph wherein $R^1$ is hydrogen, and $R^2$ is hydrogen or a linear alkyl group.

As used herein, the term "bromobutyl" or "bromobutyl polymer" refers to brominated isobutylene-isoprene or brominated isobutylene-isoprene rubber ("BIIR") as manufactured by ExxonMobil Chemical, a family of butyl rubbers used in a variety of consumer applications including tires and various medical applications.

Bromobutyl 2222, also known as BIIR 2222, refers to a brominated copolymer of isobutylene and isoprene having a specific gravity of 0.93; a Mooney viscosity target of 32, a minimum of 28, and a maximum of 36; a bromine composition target of 1.03%, a minimum of 0.93%, and a maximum of 1.13%; and a calcium composition target of 0.15%, a minimum of 0.12%, and a maximum of 0.18%.

The term "isoolefin" refers to a $C_4$ to $C_7$ compound and includes, but is not limited to, isobutylene, isobutene 2-methyl-1-butene, 3-methyl-1-butene, 2-methyl-2-butene, and 4-methyl-1-pentene. The multiolefin is a $C_4$ to $C_{14}$ conjugated diene such as isoprene, butadiene, 2,3-dimethyl-1,3-butadiene, myrcene, 6,6-dimethyl-fulvene, cyclopentadiene, hexadiene and piperylene. An exemplary polymer can be obtained by reacting 92 to 99.5 wt % of isobutylene with 0.5 to 8 wt % isoprene, or reacting 95 to 99.5 wt % isobutylene with from 0.5 to 5.0 wt % isoprene.

The term "olefin" refers to a linear, branched, or cyclic compound comprising carbon and hydrogen and having a hydrocarbon chain containing at least one carbon-to-carbon double bond in the structure thereof, where the carbon-to-carbon double bond does not constitute a part of an aromatic ring. The term "olefin" is intended to embrace all structural isomeric forms of olefins, unless it is specified to mean a single isomer or the context clearly indicates otherwise.

As used herein, a "polymer" has two or more of the same or different "mer" units. A "homopolymer" is a polymer having mer units that are the same. A "copolymer" is a polymer having two or more mer units which are different from each other. Copolymer means polymers having more than one type of monomer, including interpolymers, terpolymers, or higher order polymers. A "terpolymer" is a polymer having three mer units that are different from each other. "Different" in reference to mer units indicates that the mer units differ from each other by at least one atom or are different isomerically. The terms polyolefin and polymer are sometimes used interchangeably herein.

More specifically, the term "copolymer" refers to random polymers of $C_4$ to $C_7$ isoolefins derived units and alkylstyrene. For example, a copolymer can contain at least 85% by weight of the isoolefin, about 8 to about 12% by weight alkylstyrene, and about 1.1 to about 1.5 wt % of a halogen. For example, a copolymer can be a random elastomeric copolymer of a $C_4$ to $C_7$ alpha-olefin and a methylstyrene containing at about 8 to about 12% by weight methylstyrene, and 1.1 to 1.5 wt % bromine or chlorine. Alternatively, random copolymers of isobutylene and para-methylstyrene ("PMS") can contain from about 4 to about 10 mol % para-methylstyrene wherein up to 25 mol % of the methyl substituent groups present on the benzyl ring contain a bromine or chlorine atom, such as a bromine atom (para-(bromomethylstyrene)), as well as acid or ester functionalized versions thereof.

Furthermore, copolymers can be substantially free of ring halogen or halogen in the polymer backbone chain. In an aspect, the random polymer is a copolymer of $C_4$ to $C_7$ isoolefin derived units (or isomonoolefin), para-methylstyrene derived units and para-(halomethylstyrene) derived units, wherein the para-(halomethylstyrene) units are present in the polymer from about 10 to about 22 mol % based on the total number of para-methylstyrene, and wherein the para-methylstyrene derived units are present from 8 to 12 wt % based on the total weight of the polymer or from 9 to 10.5 wt %. Also, for example, para-(halomethylstyrene) can be para-(bromomethylstyrene).

As used herein, comonomers can be linear or branched. Linear comonomers include, but are not limited to, ethylene or $C_4$ to $C_8$ α-olefins, 1-butene, 1-hexene, and 1-octene. Branched comonomers include 4-methyl-1-pentene, 3-methyl-1-pentene, and 3,5,5-trimethyl-1-hexene. Comonomers include styrene.

As used herein, EXXPRO™ refers to a brominated isobutylene para methyl styrene (BIMSM) rubber or isobutylene-co-para-methyl-styrene based elastomer, produced by catalytic polymerization of isobutylene and isoprene and manufactured by ExxonMobil useful in a variety of consumer applications including tires and medical tube stoppers.

The term "rubber" includes, but is not limited to, a composition having at least one or more of an isobutylene-based polymer such as star-branched brominated butyl (polyisobutylene/isoprene copolymer), halogenated poly (isobutylene-co-p-methylstyrene), terpolymers of isobutylene derived units, p-methylstyrene derived units, p-bromomethylstyrene derived units (BrIBMS), halogenated isoprene, halogenated isobutylene copolymers, halogenated terpolymer of isobutylene/isoprene/para-alkylstyrene polychloroprene, and halomethylated aromatic interpolymers as described in U.S. Pat. Nos. 5,162,445, 4,074,035, and 4,395, 506, and mixtures of any of the above. The term rubber means and includes, but is not limited to, brominated butyl rubber, chlorinated butyl rubber, star-branched polyisobutylene rubber and halogenated rubbers are also described in U.S. Pat. Nos. 4,703,091 and 4,632,963.

As used herein, "halogenated butyl rubber" refers to both butyl rubber and so-called "star-branched" butyl rubber. The halogenated rubber can be a halogenated copolymer of a $C_4$ (as noted sometimes as "C4") to $C_7$ (also noted sometimes as "C7") isoolefin and a multiolefin. The halogenated rubber component can be a blend of a polydiene or block copolymer, and a copolymer of a $C_4$ to $C_7$ isoolefin and a conjugated, or a "star-branched" butyl polymer. The halogenated butyl polymer can be described as a halogenated elastomer comprising $C_4$ to $C_7$ isoolefin derived units, multi-olefin derived units, and halogenated multiolefin derived units, and includes both "halogenated butyl rubber" and so called "halogenated star-branched" butyl rubber.

As described herein, rubber can be a halogenated rubber or halogenated butyl rubber such as brominated butyl rubber or chlorinated butyl rubber. General properties and processing of halogenated butyl rubbers is described in THE VANDERBILT RUBBER HANDBOOK 105-122 (R. F. Ohm ed., R.T. Vanderbilt Co., Inc. 1990), and in RUBBER TECHNOLOGY 311-321 (1995). Butyl rubbers, halogenated butyl rubbers, and star-branched butyl rubbers are described by E. Kresge and H. C. Wang in 8 KIRK-OTHMER ENCYCLOPEDIA OF CHEMICAL TECHNOLOGY 934-955 (John Wiley & Sons, Inc. 4th ed. 1993).

Halogenated butyl rubber can be produced from the halogenation of butyl rubber. Halogenation can be carried out by any means, and the invention is not herein limited by the halogenation process. Methods of halogenating polymers such as butyl polymers are disclosed in U.S. Patent Nos. 2,631,984, 3,099,644, 4,554,326, 4,681,921, 4,650, 831, 4,384,072, 4,513,116 and 5,681,901. The halogen can be in the so called II and III structures as discussed in, for example, RUBBER TECHNOLOGY at 298-299 (1995). The butyl rubber can be halogenated in hexane diluent at from 40 to 60° C. using bromine ($Br_2$) or chlorine ($Cl_2$) as the halogenation agent. The halogenated butyl rubber has a Mooney viscosity of from 20 to 70 (ML 1+8 at 125° C.), or from 25 to 55. The halogen content is from 0.1 to 10 wt % based in on the weight of the halogenated butyl rubber or from 0.5 to 5 wt %. The halogen wt % of the halogenated butyl rubber is from 1 to 2.2 wt %.

Star-branched halogenated butyl rubber ("SBHR") is a composition of a butyl rubber, either halogenated or not, and a polydiene or block copolymer, either halogenated or not. This halogenation process is described in detail in U.S. Pat. Nos. 4,074,035, 5,071,913, 5,286,804, 5,182,333 and 6,228, 978. The secondary polymer is not limited by the method of forming the SBHR. The polydienes/block copolymer, or branching agents (hereinafter "polydienes"), are typically cationically reactive and are present during the polymerization of the butyl or halogenated butyl rubber, or can be blended with the butyl or halogenated butyl rubber to form the SBHR. The branching agent or polydiene can be any suitable branching agent, and the invention is not limited to the type of polydiene used to make the SBHR.

The SBHR is typically a composition of butyl or halogenated butyl rubber and a copolymer of a polydiene and a partially hydrogenated polydiene selected from the group including styrene, polybutadiene, polyisoprene, polypiperylene, natural rubber, styrene-butadiene rubber, ethylene-propylene diene rubber, styrene-butadiene-styrene and styrene-isoprene-styrene block copolymers. These polydienes are present, based on the monomer wt %, greater than 0.3 wt %, or from 0.3 to 3 wt % or from 0.4 to 2.7 wt %.

A commercial SBHR is Bromobutyl 6222 (ExxonMobil Chemical Company), having a Mooney viscosity (ML 1+8 at 125° C., ASTM 1646, modified) of from 27 to 37, and a bromine content of from 2.2 to 2.6 wt % relative to the SBHR. Further, cure characteristics of Bromobutyl 6222 are as follows: MH is from 24 to 38 dNm, ML is from 6 to 16 dNm (ASTM D2084, modified).

An exemplary halogenated butyl rubber is Bromobutyl 2222 (ExxonMobil Chemical Company). Its Mooney viscosity is from 27 to 37 (ML 1+8 at 125° C., ASTM 1646, modified), and the bromine content is from 1.8 to 2.2 wt % relative to the Bromobutyl 2222. Further, cure characteristics of Bromobutyl 2222 are as follows: MH is from 28 to 40 dNm, ML is from 7 to 18 dNm (ASTM D2084, modified). Another commercial available halogenated butyl rubber used as the secondary polymer is Bromobutyl 2255 (ExxonMobil Chemical Company). Its Mooney viscosity is from 41 to 51 (ML 1+8 at 125° C., ASTM 1646, modified), and the bromine content is from 1.8 to 2.2 wt %. Further, cure characteristics of Bromobutyl 2255 are as follows: MH is from 34 to 48 dNm, ML is from 11 to 21 dNm (ASTM D2084, modified).

In an aspect, the olefin polymerization feeds employed in producing halogenated butyl rubber include those olefinic compounds conventionally used in the preparation of butyl-type rubber polymers. The butyl polymers are prepared by reacting a co-monomer mixture, the mixture having at least one (1) $C_4$ to $C_7$ isoolefin monomer component such as isobutylene with (2) a multi-olefin, or conjugated diene, monomer component. The isoolefin is in a range from 70 to 99.5 wt % by weight of the total comonomer mixture, or 85 to 99.5 wt %. The conjugated diene component is present in the comonomer mixture from 30 to 0.5 wt % or from 15 to 0.5 wt %. From 8 to 0.5 wt % of the co-monomer mixture is conjugated diene.

Isobutylene-based polymers described herein can be a copolymer such as isobutylene polymerized with co-monomers (other than isoprene) such as isobutylene co-para-methyl styrene copolymer (also referred to as isobutylene co-para-methyl styrene elastomer) and halogenated versions of the same. Further examples of isobutylene-based polymers include isobutylene-isoprene elastomers such as butyl ("IIR"), halogenated elastomers such as bromobutyl ("BIIR"), chlorobutyl ("CIIR"), star branched bromobutyl ("SBB"), and star branched chlorobutyl ("SBC") and brominated isobutylene para-methyl styrene ("BIMSM"). Isobutylene co-para-methyl styrene elastomer and brominated isobutylene para-methyl styrene ("BIMSM") are currently sold under the trade name of EXXPRO™.

As provided herein, functionalized polyolefins are functionalized polymers (also referred to sometimes as functionalized olefins) having one or more polar and nonpolar functionalities, i.e., specific groups or moieties of atoms or bonds within the molecules that are responsible for the characteristic chemical reactions of the molecules. The functional group can undergo the same or similar chemical reaction regardless of the size of the polymer backbone, allowing for systematic prediction of chemical reactions and polymer behavior as well as design of chemical synthesis. Once functionalized, atoms of the functional groups are typically linked to each other and the polymer by covalent bonds. The reactivity of a functional group can be modified by other functional groups nearby.

Randomly functionalized polyolefins have differing types, location and amount of functionality on the polyolefin backbone. Categories of functionalized polyolefin include randomly functionalized polyolefins and graft polyolefins. Using a post-functionalization technique, the functionality (moiety or chemical group) is attached onto a preexisting polymer backbone.

To post-functionalization the polyolefin backbone, the functionality can be attached onto the backbone via nucleophilic substitution. As exemplified immediately below, nucleophilic substitution is typically carried out in the presence of a solvent such as THF, toluene or xylene:

Nu = phenoxide, alkoxide, carboxylate, thiolates, thioethers, thiocarboxylates, dithiocarboxylates, thiourea, dithiocarbamates, xanthates, thiocyanates, silanes, amines, phosphines

Once attached to the polyolefin chain, further functionalization process can be promoted.

The present methods are directed to post-polymerization modification of a polymer comprising the step of reacting the polymer with at least one nucleophile selected from the group consisting of thioacetate, phenoxide, alkoxide, carboxylate, thiolate, thiocarboxylate, dithiocarboxylate, thiourea, thiocarbamate, dithiocarbamate, xanthate, thiocyanate, in a nucleophilic substitution reaction performed without a solvent to produce a functionalized polymer. The mixing step of the present methodology can be performed in the presence of a metal salt such as potassium thioaceate and mercapthiazole. The mixing step of the present methodology can be performed in the presence of a phase transfer catalyst such as an ammonium salt, a heterocyclic ammonium salt, a phosphonium salt, DL-α-Tocopherol methoxypolyethylene glycol succinate, and/or DL-α-Tocopherol methoxypolyethylene glycol succinate solution.

More specifically, ammonium salts include, but are not limited to, tetrabutylammonium bromide, benzalkonium chloride, benzyldimethyldecylammonium chloride, benzyldimethyldodecylammonium chloride, benzyldimethylhexadecylammonium chloride, benzyldimethyl(2-hydroxyethyl)ammonium chloride, benzyldimethyloctylammonium chloride, benzyldimethyltetradecylammonium chloride anhydrous, benzyldimethyltetradecylammonium chloride dihydrate, benzyldodecyldimethylammonium bromide, benzyldodecyldimethylammonium bromide, benzyltributylammonium bromide, benzyltributylammonium chloride, benzyltributylammonium iodide, benzyltriethylammonium bromide, benzyltrimethylammonium chloride, benzyltrimethylammonium dichloroiodate, benzyltrimethylammonium tetrachloroiodate, benzyltrimethylammonium tribromide, Bis(triphenylphosphoranylidene)ammonium chloride(2-Bromoethyl)trimethylammonium bromide and the like. See, www.sigmaaldrich.com/chemistry/chemistry-products.html.

The polymers which can be modified include, but are not limited to, halogenated isoolefin polymers, halobutyl rubber, star-branched bromobutyl, brominated poly(isobutylene-co-para-methylstyrene) ("BIMSM"), and brominated isobutylene-isoprene-para-methylstyrene terpolymers.

Figure 3:
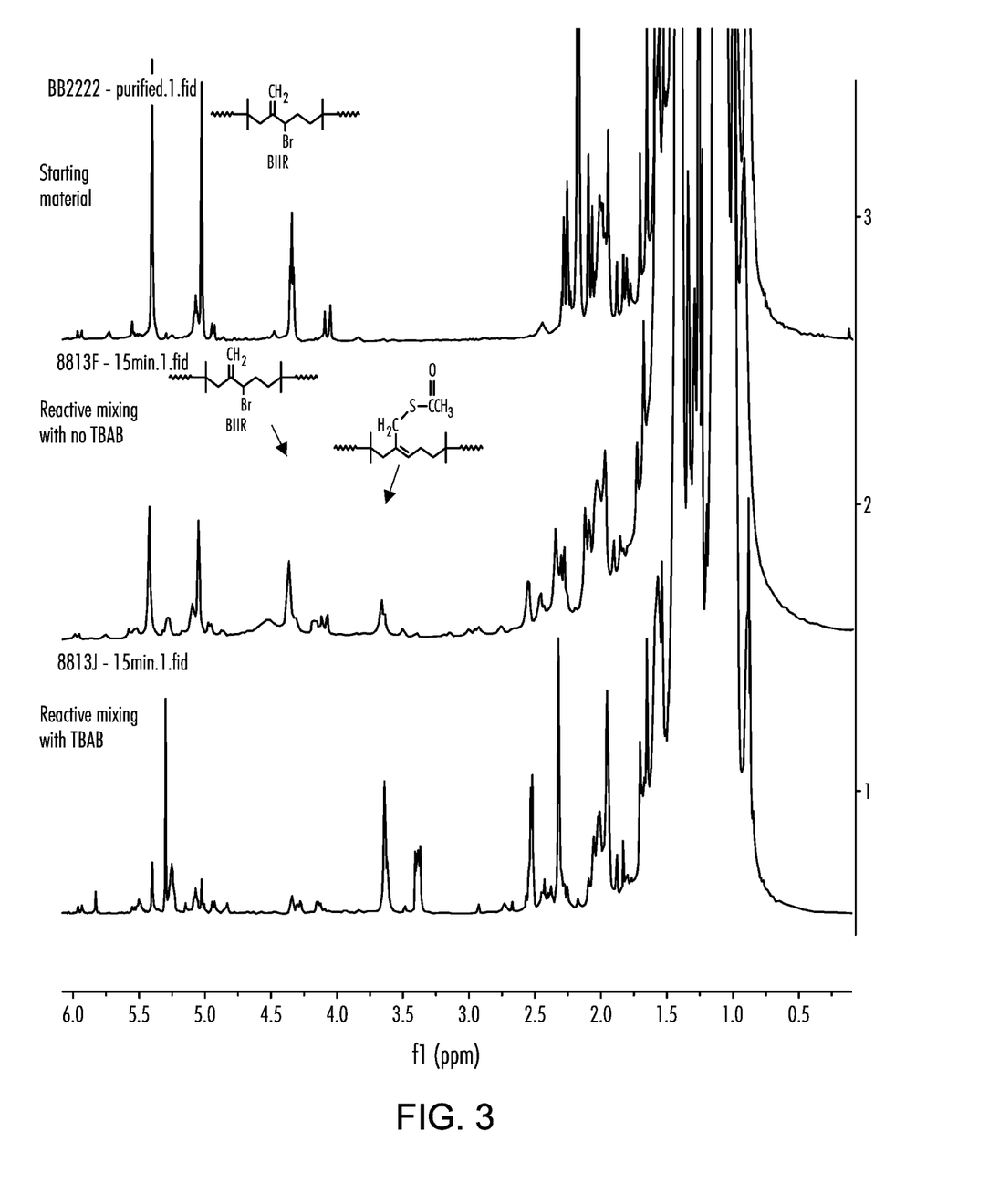
FIG. 3 is a $^1H$ NMR spectra of bromobutyl starting material and thioacetate functionalized poly(isobutylene-co-isoprene)) products obtained via reactive mixing without TBAB in Example 8 and with 0.1 mol equivalent of TBAB as described in Example 9.
Figure 4:
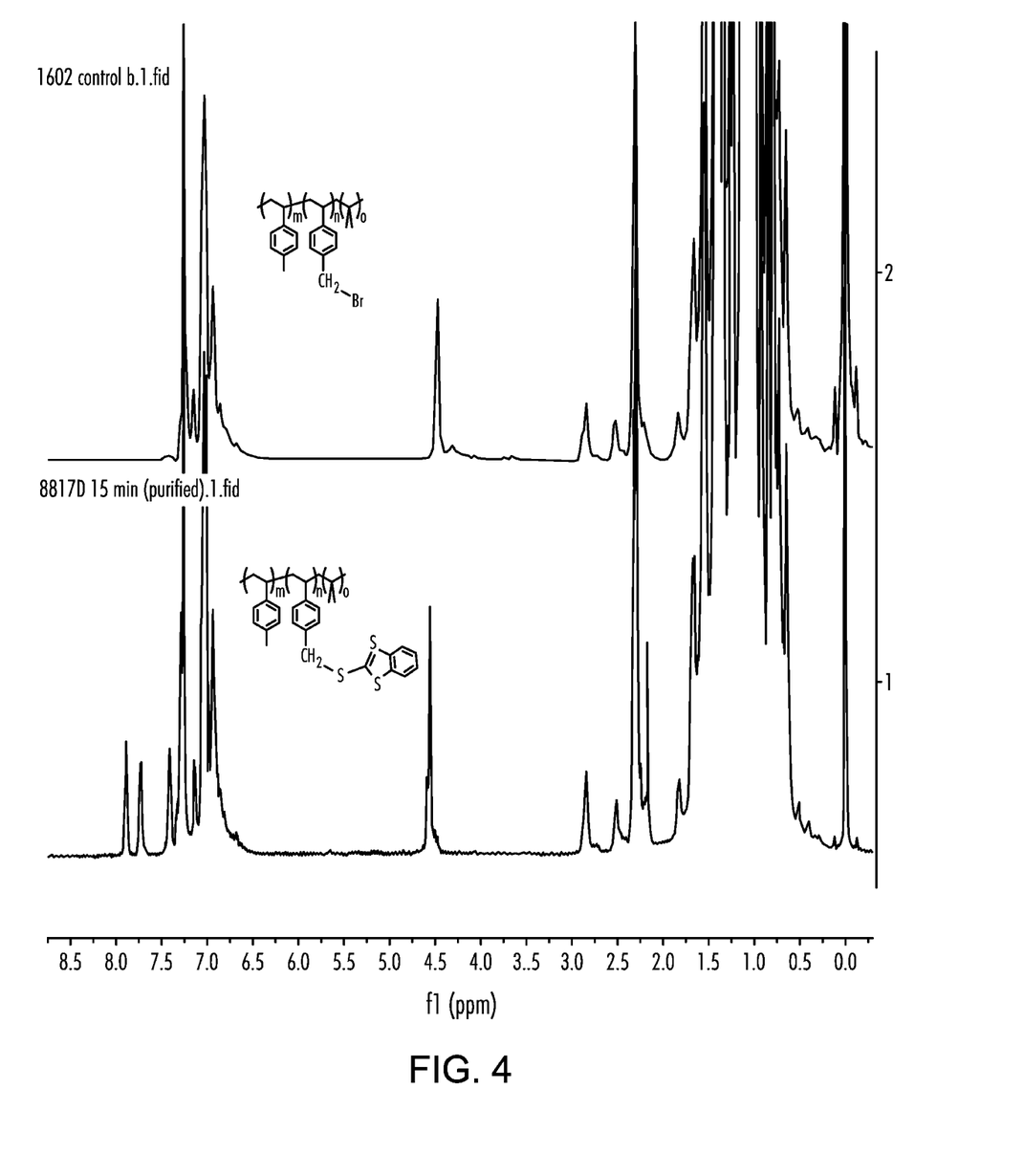
FIG. 4 is a $^1H$ NMR spectra of BIMSM starting material and the mercaptothiazole functionalized poly(isobutylene-co-para-methylstyrene)) products obtained via reactive mixing with 0.1 mol equivalent of TBAB as described in Example 10.
Figure 5:
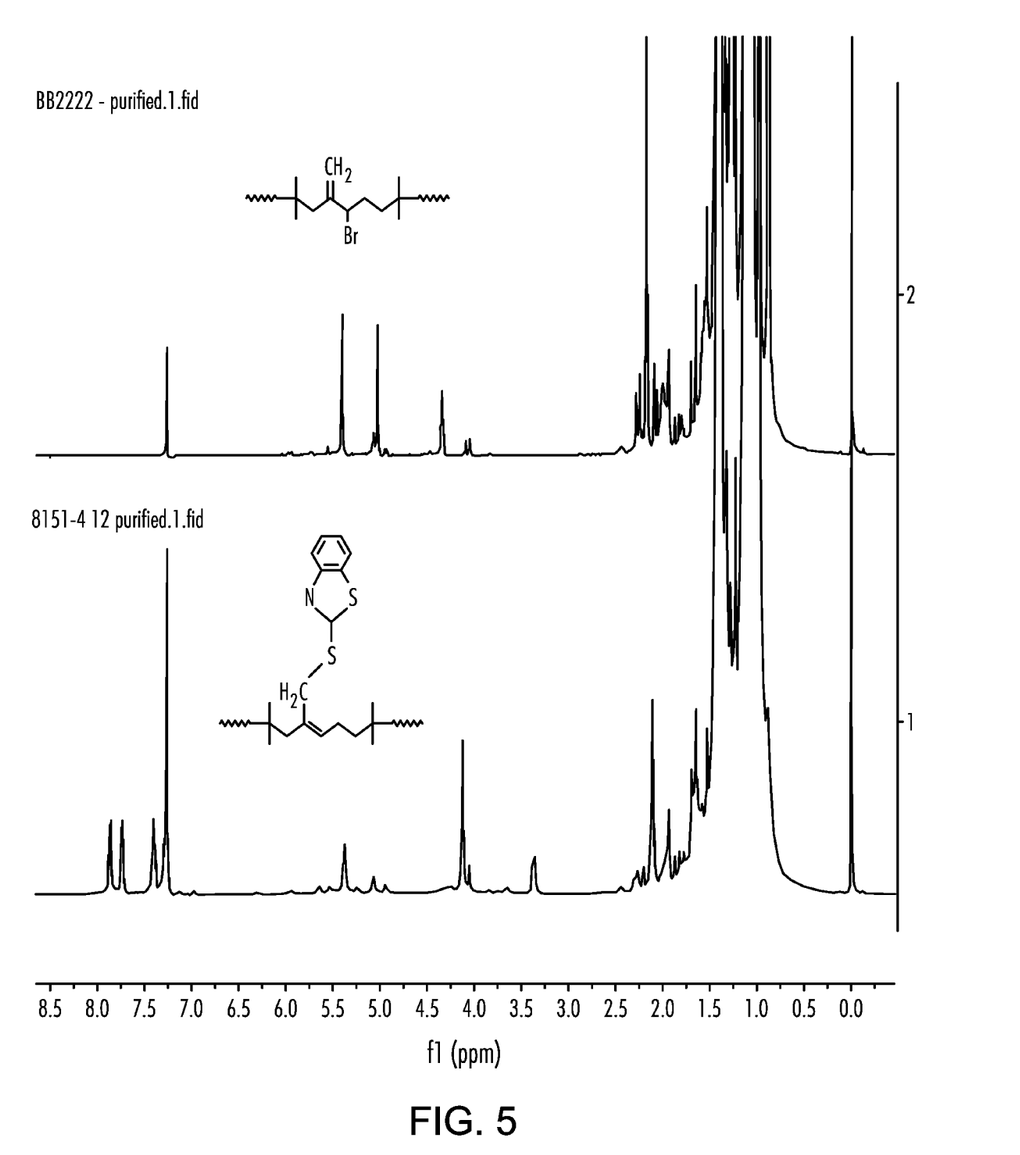
FIG. 5 is a $^1H$ NMR spectra of bromobutyl starting material and the mercaptothiazole functionalized poly (isobutylene-co-para-methylstyrene) products obtained via reactive mixing with 0.1 mol equiv. of TBAB as described in Example 11.
Figure 6:
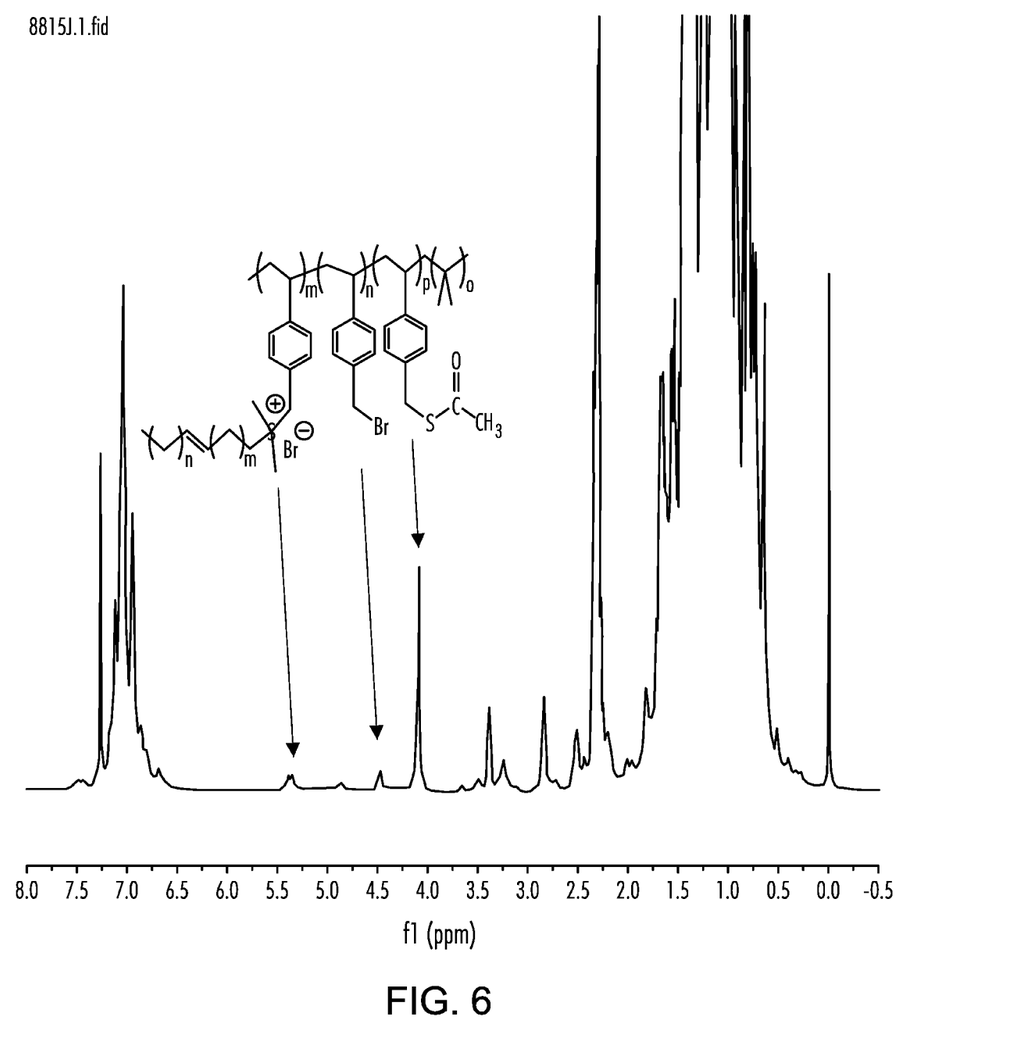
FIG. 6 is a $^1$H-NMR spectra of the thioacetate/amine functionalized poly(isobutylene-co-para-methylstyrene) products obtained via reactive mixing as described in Example 12.

As described in Examples 2 to 7 below, we have demonstrated a clean, solvent-free method via reactive mixing of a polymer facilitated by the presence of a phase transfer catalyst, tetrabutylammonium bromide. In this methodology, the grafting of thioacetate onto BIMSM is performed as follows:

As described in Example 9 and FIG. 3, we have demonstrated a clean, solvent-free method via reactive mixing of bromobutyl polymer facilitated by the presence of a phase transfer catalyst, tetrabutylammonium bromide. In this methodology, grafting of thioacetate onto bromobutyl is performed as follows:

As described in Example 10 and FIG. 4, we have demonstrated a clean, solvent-free method via reactive mixing of the BIMSM polymer facilitated by the presence of a phase transfer catalyst, tetrabutylammonium bromide. In this methodology, grafting of mercaptobenzothiazole onto BIMSM is performed as follows:

As described in Example 11 and FIG. 5, we have demonstrated a clean, solvent-free method via reactive mixing of the bromobutyl polymer facilitated by the presence of a phase transfer catalyst, tetrabutylammonium bromide. In this methodology, grafting of mercaptobenzothiazole onto bromobutyl is performed as follows:

As described in Example 12 and FIG. 6, we have demonstrated a clean, solvent-free method via reactive mixing of the BIMSM polymer facilitated by the presence of an amine ionomer acting both a nucleophile and as a phase catalyst. In this methodology, grafting of an amine first, then followed by grafting of thioaceate onto BIMSM is performed as follows:

EXAMPLE 1

Figure 1:
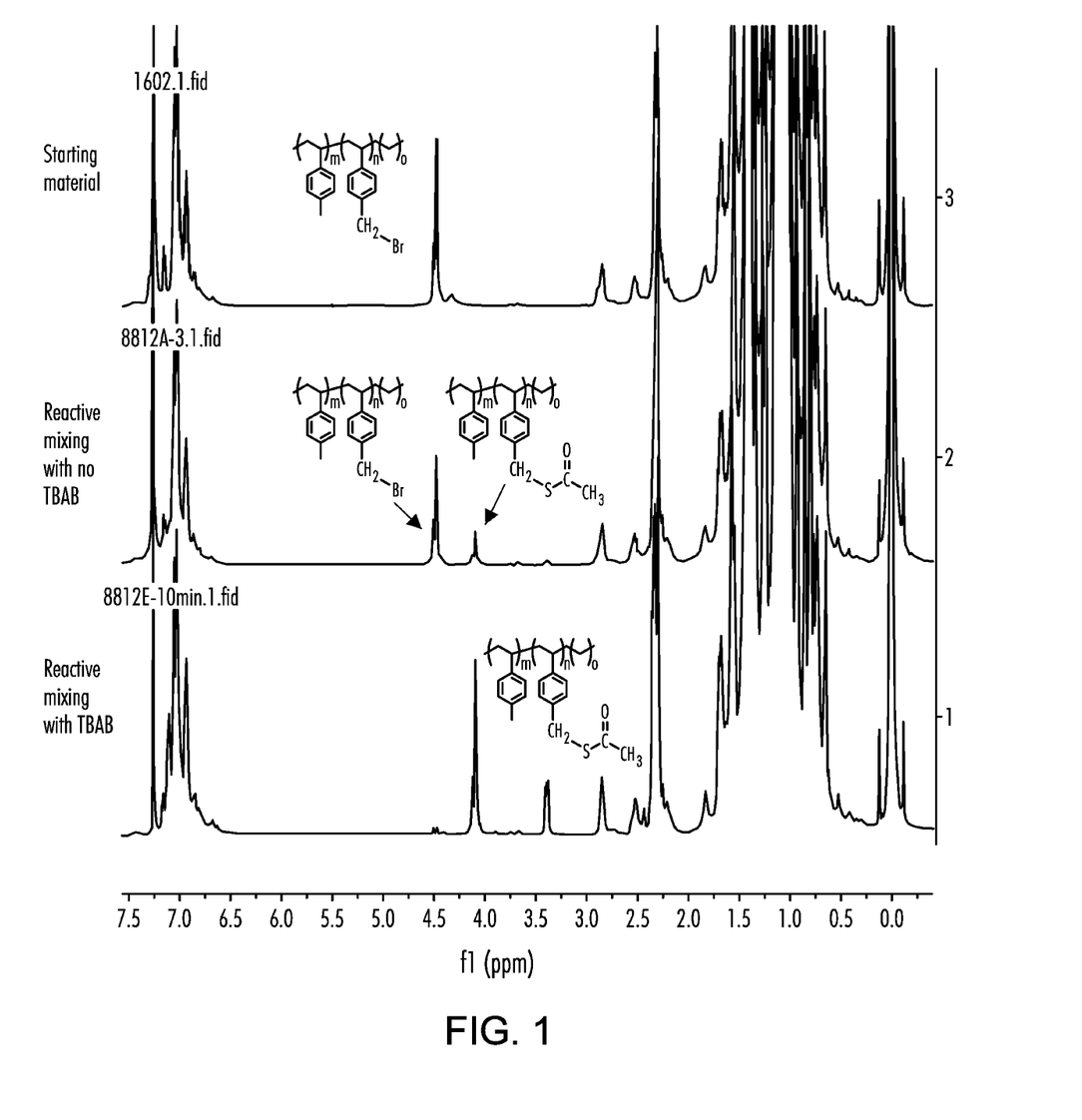
FIG. 1 is a $^1H$ NMR spectra of BIMSM starting material and the thioacetate functionalized poly(isobutylene-co-para-methylstyrene)) products obtained via reactive mixing without TBAB as described in Example 1 and with 0.1 mol equivalent of TBAB as described in Example 3.
Figure 2:
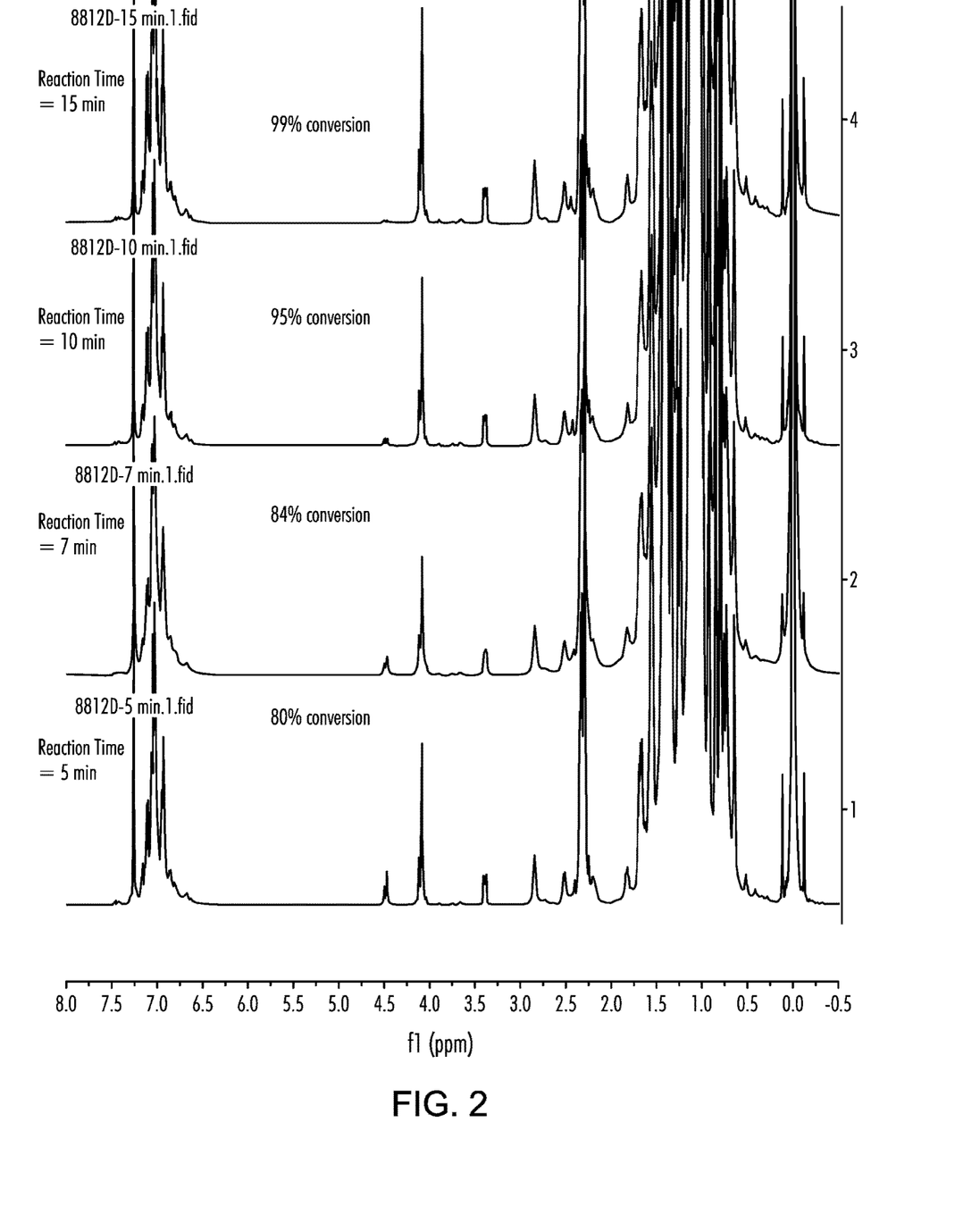
FIG. 2 is a $^1H$ NMR spectra showing reaction conversion as a function of reaction time.

Preparation of Thioacetate Functionalized Poly(isobutylene-co-para-methylstyrene) by Reactive Mixing Process Without Tetrabutylammonium Bromide In this example, the experiment was performed in a Brabender Intelli-torque internal mixer using roller type 6 blades. The mixer temperature was set to between 70° C. to 120° C. 60 g of BIMSM (EXXPRO-NPX1602, Experimental product from ExxonMobil Chemical) was added to mixer and allowed to flux for 30 seconds at 25 rpm. 1.78 g of potassium thioacetate was added to the mixer. The mixing speed was set to 60 rpm and allowed to mix for 15 minutes. The final mix was removed from the mixer and cooled to about 23° C. to about 25° C. by pressing between two Teflon sheets in a Carver press. As noted below in Table 1, without TBAB, the final product of Example 1 was approximately 24% converted as shown by 1H-NMR analysis as shown in FIG. 1.

EXAMPLES 2 THROUGH 7

Preparation of Thioacetate Functionalized Poly(isobutylene-co-para-methylstyrene) by Reactive Mixing Process With a Catalytic Amount of Tetrabutyl Ammonium Bromide Each of the reactive mixing examples were performed in a Brabender Intelli-torque internal mixer using roller type 6 blades. The mixer temperature was set to between 70° C. to 120° C. 60 g of BIMSM (EXXPRO-NPX1602, Experimental product from ExxonMobil Chemical) and a series of BIMSM with varying Br content was added to mixer and allowed to flux for 30 seconds at 25 rpm, 0.45 g (0.11 mole equivalent to PMS-Br) of tetrabutyl ammonium bromide (TBAB) and 1.78 g of potassium thioacetate were added together to the mixer. The mixing speed was set to 60 rpm and allowed to mix for 15 minutes. The final mix was removed from the mixer and cooled to about 23° C. to about 25° C. by pressing between two Teflon sheets in a Carver press. Several samples of BIMSM with varying bromine content were used as starting material in subsequent reactive mixing experiments using the same procedure. As provided in Table 1 immediately below, the final products were obtained in quantitative yield with >91% conversion by $^1$H-NMR analysis as shown in FIG. 1.

TABLE 1

Various Thioacetate Functional Poly(isobutylene-co-para-methylstryene) Products

| Polymer Base | PMS-Br (mol %) | TBAB (mol. equiv. to PMS-Br) | Potassium thioacetate (mol equiv. to PMS-Br) | % Conversion |
|---|---|---|---|---|
| Example 1 | 1.3 | 0 | 1.2 | 24 |
| Example 2 | 1.3 | 0.12 | 1.2 | 99 |
| Example 3 | 1.52 | 0.1 | 1.29 | 97 |
| Example 4 | 1.61 | 0.09 | 1.25 | 91 |
| Example 5 | 1.86 | 0.08 | 1.29 | 94 |
| Example 6 | 1.89 | 0.08 | 1.28 | 97 |
| Example 7 | 1.25 | 0.12 | 1.3 | 91 |

EXAMPLE 8

Preparation of Thioacetate Functionalized Poly(Isobutylene-Co-Isoprene) by Reactive Mixing Process Without Tetrabutyl Ammonium Bromide In this example, the experiment was performed in a Brabender Intelli-torque internal mixer using roller type 6 blades. The mixer temperature was set to between 120° C. to 150° C. 60 g of Bromobutyl 2222 was added to mixer and allowed to flux for 30 seconds at 25 rpm. 1.78 g (ca. 1.26 mol. equiv. to allylic-Br) was added to the mixer. The mixing speed was set to 60 rpm and allowed to mix for 15 minutes. The final mix was removed from the mixer and cooled to about 23° C. to about 25° C. by pressing between two Teflon sheets in a Carver press. The final product was approximately 25% converted as shown by $^1$H-NMR analysis as shown in FIG. 3.

EXAMPLE 9

Preparation of Thioacetate Functionalized Poly(Isobutylene-Co-Isoprene) by Reactive Mixing Process With a Catalytic Amount of Tetrabutyl Ammonium Bromide The reactive mixing experiment was performed in a Brabender Intelli-torque internal mixer using roller type 6 blades. The mixer temperature was set between 120° C. to 150° C. 60 g of Bromobutyl 2222 was added to mixer and allowed to flux for 30 seconds at 25 rpm, 0.45 g (0.11 mol. equiv. to PMS-Br) of tetrabutyl ammonium bromide ("TBAB") and 1.69-1.78 g (1.20-1.26 mol. equiv. to allylic-Br) of potassium thioacetate. The mixing speed was set to 60 rpm and allowed to mix for 15 minutes. The final mix was removed from the mixer and cooled to about 23° C. to about 25° C. by pressing between two Teflon sheets in a Carver press. The final product was obtained in quantitative yield with >88% conversion by $^1$H-NMR analysis as shown in FIG. 3.

EXAMPLE 10

Preparation of Mercaptobenzothiazole Functionalized Poly(Isobutylene-Co-Para-Methylstyrene) by Reactive Mixing Process With a Catalytic Amount of Tetrabutyl Ammonium Bromide The reactive mixing experiments were performed in a Brabender Intelli-torque internal mixer using roller type 6 blades. The mixer temperature was set to between 70° C. to 120° C. 60 g of BIMSM (EXXPRO-NPX1602, Experimental product from ExxonMobil Chemical) was added to mixer and allowed to flux for 30 seconds at 25 rpm, 0.45 g (0.11 mol. equiv. to PMS-Br) of tetrabutyl ammonium bromide ("TBAB") and 3.09 g (1.25 mol. equiv. to PMS-Br) of sodium mercaptobenzothiazole. The mixing speed was set to 60 rpm and allowed to mix for 15 minutes. The final mix was removed from the mixer and cooled to about 23° C. to about 25° C. by pressing between two Teflon sheets in a Carver press. The final product was obtained in quantitative yield with >92% conversion by $^1$H-NMR analysis as shown in FIG. 4.

EXAMPLE 11

Preparation of Mercaptobenzothiazole Functionalized Poly(isobutylene-co-isoprene) by Reactive Mixing Process With a Catalytic Amount of Tetrabutyl Ammonium Bromide The mixing experiments were performed in a Brabender Intelli-torque internal mixer using roller type 6 blades. The mixer temperature was set to between 70° C. to 120° C. 60 g of Bromobutyl 2222 was added to mixer and allowed to flux for 30 seconds at 25 rpm, 0.45 g (0.11 mol. equiv. to PMS-Br) of tetrabutyl ammonium bromide ("TBAB") and 2.94 g (1.20 mol. equiv. to PMS-Br) of sodium mercaptobenzothiazole. The mixing speed was set to 60 rpm and allowed to mix for 15 minutes. The final mix was removed from the mixer and cooled to about 23° C. to about 25° C. by pressing between two Teflon sheets in a Carver press. Final product was obtained in quantitative yield with >94% conversion by $^1$H-NMR analysis as shown in FIG. 5.

EXAMPLE 12

Preparation of Thioacetate/Amine Functionalized Poly(isobutylene-co-para-methylstyrene) by Reactive Mixing Process All reactive mixing experiments were performed in a Brabender Intelli-torque internal mixer using roller type 6 blades. The mixer temperature was set to between 70-120° C. 60 g of BIMSM (EXXPRO-NPX1602, Experimental product from ExxonMobil Chemical) was added to mixer and allowed to flux for 30 seconds at 25 rpm, 0.5 g or 0.12 mol equiv. of Armeen DMSVD was added slowly to the mixer. Once addition is complete, the compound was mixed for approximately minutes at 60 rpms. 1.63 g of potassium thioacetate was then added and allowed to mix for an additional 6 minutes at 60 rpms. The final mix was removed from the mixer and cooled to room temperature by pressing between two Teflon sheet in a Carver press. The final products were obtained in quantitative yield with >95% conversion by $^1$H-NMR analysis as shown in FIG. 6.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While this teaching has been described with respect to a number of aspects and examples, those skilled in the art, having benefit of this disclosure, will appreciate that other aspects can be devised which do not depart from the scope and spirit of the inventions disclosed herein.

The invention claimed is:

1. A method of post-polymerization modification of a polymer, comprising the steps of:
   (a) reacting a polymer with at least one nucleophile in a nucleophilic substitution reaction; and
   (b) recovering a functionalized polymer;
   wherein the functionalized polymer is a thioacetate functionalized poly(isobutylene-co-para-methylstyrene); and
   wherein the reaction is substantially free of a solvent.

2. The method of claim 1, further comprising the step of mixing a metal salt or an organic cationic salt with the polymer.

3. The method of claim 1, wherein the nucleophilic substitution reaction is performed in the presence of a phase transfer catalyst.

4. The method of claim 1, wherein the nucleophilic substitution reaction is performed without the presence of a phase transfer catalyst.

5. The method of claim 1, further comprising the step of cooling the functionalized polymer to a temperature of about 22° C. to about 25° C.

6. The method of claim 3, wherein the phase transfer catalyst is selected from the group consisting of ammonium salts, heterocyclic ammonium salts, phosphonium salts, DL-α-Tocopherol methoxypolyethylene glycol succinate, DL-α-Tocopherol methoxypolyethylene glycol succinate solution, and combinations thereof.

7. The method of claim 3, wherein the phase transfer catalyst is tetrabutylammonium-halide;
   wherein the halide of the tetrabutylammonium-halide is selected from the group consisting of fluoride, chloride, bromide, and iodide.

8. The method of claim 1, wherein the polymer is a halogenated isoolefin.

9. The method of claim 8, wherein the polymer is brominated poly(isobutylene-co-para-methylstyrene).

10. The method of claim 2, wherein the metal salt is potassium thioacetate.

11. The method of claim 2, wherein the metal salt is sodium mercaptobenzothiazole.

12. The method of claim 1, wherein the temperature of the nucleophilic substitution reaction is between about 70° C. to about 160° C.

13. The method of claim 1, wherein the reaction time of the nucleophilic substitution reaction is about 10 minutes to about 30 minutes.

* * * * *